June 5, 1962 K. HILDEBRAND 3,037,418
ELECTRO-OPTICAL DEVICE
Filed Jan. 7, 1959 2 Sheets-Sheet 1

INVENTOR
Klaus Hildebrand

By: Samuel W. Kipnis
Atty.

June 5, 1962 K. HILDEBRAND 3,037,418
ELECTRO-OPTICAL DEVICE
Filed Jan. 7, 1959 2 Sheets-Sheet 2

INVENTOR
Klaus Hildebrand.

By: Samuel W. Kipnis
Atty.

United States Patent Office 3,037,418
Patented June 5, 1962

3,037,418
ELECTRO-OPTICAL DEVICE
Klaus Hildebrand, Berlin-Neukoelln, Germany, assignor to Askania-Werke A.G., Berlin-Friedenau, Germany, a corporation of Germany
Filed Jan. 7, 1959, Ser. No. 785,349
Claims priority, application Germany Jan. 16, 1958
2 Claims. (Cl. 88—1)

This invention relates to an electro-optical device for electrical response to optical signals received from remote sources. In the operation of such devices, mainly in daylight, there is a danger that electrical response is created by stray light or optical noise, particularly when the signals are relatively weak. It has been the object of the invention to minimize this danger.

The invention is applicable for instance in the field of electro-optical distance meters, and will be described as applied in that field. Accordingly, and in keeping with known practice, a transmitter emits a light signal cyclically modulated as to intensity for instance by a polarizer-Kerr cell unit; a remote reflector returns the signal; the returned signal enters a receiver which includes an element sensitive to the emitted light, preferably a multiplier type photocell; and the phase of the output of said photocell is electronically compared with the phase of modulation of the transmitter. Further, and in accordance with the invention, effects of stray light upon the photocell are minimized by a receiver construction which desirably includes means for forming a real image of the transmitting light source, prior to the reception of the light on the sensitive element of the photocell; said construction also including an aperture element which can be moved into and in the exact plane of the first mentioned image and which is adapted thereupon to limit the light beam passing through the image area so as to substantially eliminate lateral stray light.

Figure 1:
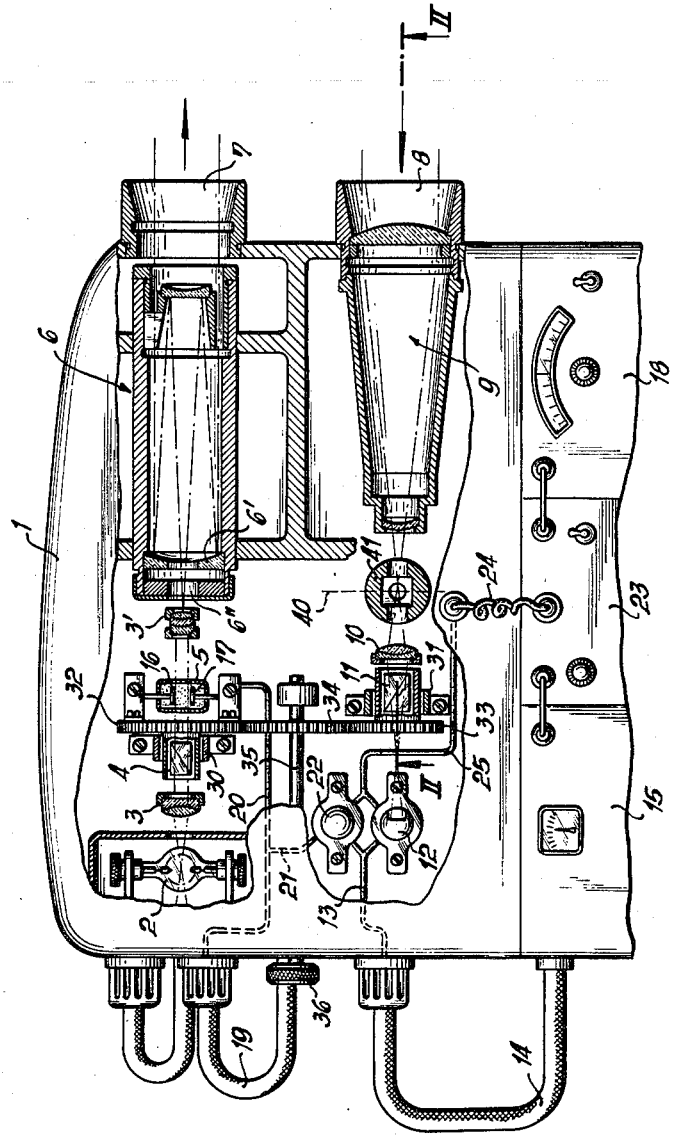
Figure 2:
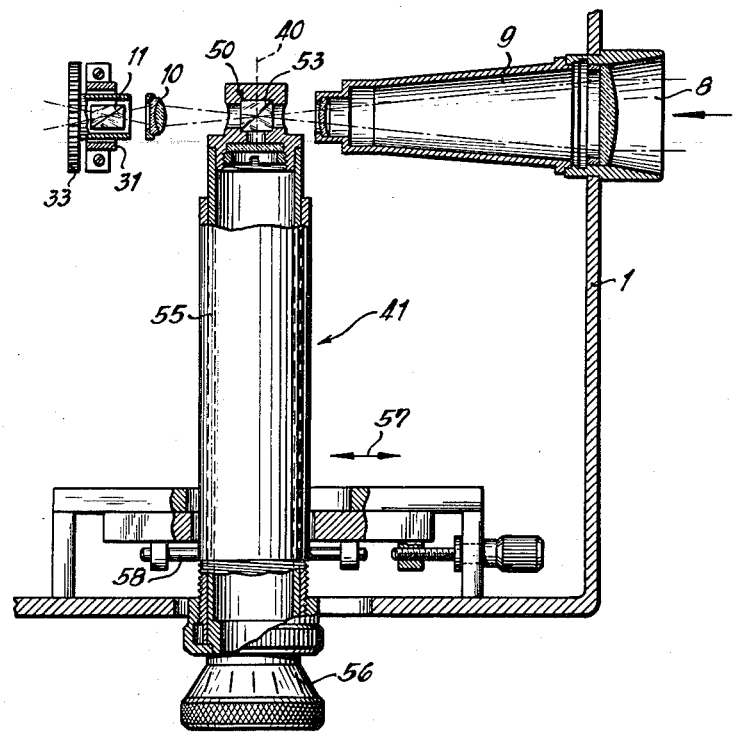
Figures 3, 4:
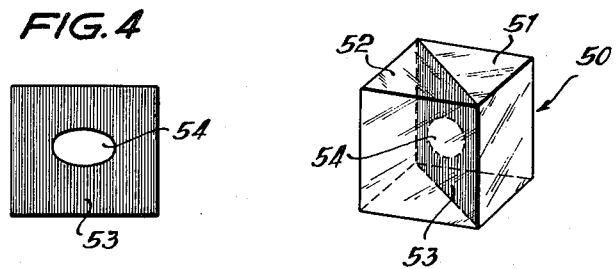

A preferred embodiment of the invention is illustrated in the drawing, wherein FIGURE 1 is a side view, partly in section, of the entire instrument; FIGURE 2 is a fragmentary section taken along line 2—2 in FIGURE 1; FIGURE 3 is a perspective view of a detail from FIGURE 2; and FIGURE 4 is a front view of a detail from FIGURE 3.

In the distance meter of FIGURE 1, transmitter and receiver are mounted in an integral housing 1. The transmitting light source 2 illuminates the remote reflector, not shown, through a collimator lens 3, polarizor 4, Kerr cell 5 and transmitting objective 6; said objective having, in the central aperture of a cassegrainian principal mirror 6', an optical negative system 3' which in effect forms a galilean telescope with the objective, capable of imaging source 2 at great distance. The light signal, cyclically modulated by Kerr cell 5, traverses the distance from transmitting window 7 of objective 6 to the remote reflector, which may be a triple mirror, and which cannot and need not be shown in FIGURE 1. It will be seen that elements 2 to 7 constitute a transmitter of cyclically modulated light signals. The light of said signals returns from the remote reflector and enters, as a light beam confined between approximately horizontal lines as shown, into the receiver portion of the illustrated instrument. In other words, the light signal retraverses said distance, whereafter it enters receiving window 8 of receiving objective 9. Said objective forms a real image of source 2, and the light then enters collector lens 10, polarization analyser 11 and the photocathode of multiplier 12. Elements 8 to 12 form the receiver assembly or subassembly of this invention. In the electrical circuit including said multiplier, and which need not be shown in detail, the modulated signal as received is demodulated, incident to which the multiplier yields a demodulation voltage, of wave shape corresponding to the modulation cycle, and the phase of which can be analyzed when conductors 13 and cable 14 have fed it to phase comparator 15.

It may be well to add that the cyclic modulation is achieved by impressing on electrodes 16, 17 of Kerr cell 5 an alternating voltage generated by oscillator 18 and fed to said Kerr cell by cable 19 and conductors 20. As electronic noise is generated by photocell 12 it is preferred, in accordance with the disclosure of Hugo Pocher, Serial No. 780,899 filed December 16, 1958, as a continuation of Serial No. 649,938 filed April 1, 1957, now abandoned, to feed the comparison signal to phase comparator 15 via multiplier dynode tube 22 and conductors 21; the two multipliers 12, 22 being of largely identical construction and being operated in a symmetrical arrangement. It is however possible also, as shown for instance in the application of the present inventor and of Pocher, Serial No. 813,224, now U.S. Patent 3,019,690, filed May 14, 1959, as a division of the now abandoned application Serial No. 645,110 filed March 11, 1957, to utilize a single multiplier or photocell which receives both measuring and comparison signals, the latter by means of a novel combination of light short-circuiting and phase shifting elements. The systems of applications Serial Nos. 780,899 and 813,224, accordingly, are largely devoted to the suppression of electronic noise in an electro-optical system.

Optical noise, as initially mentioned, constitutes an additional problem if a device of the present type shall operate sensitively and accurately; in fact, it has now been realized that, although some aspects of the latter problem have already been brought under control, more work remained to be done. Referring first to such aspects as are already known: in Serial No. 623,571 filed November 21, 1956, now Patent 2,909,958, the present inventor has disclosed an analyzer-polarizer-modulator system equipped with such gearing that the analyzer can be turned in a way minimizing stray polarized light and that the polarizer-modulator automatically remains properly oriented relative to the analzer. Accordingly elements 4 and 11 of the present instrument are mounted in bearings 30 and 31 respectively and are rotatable by gears 32 and 33 respectively, both of which have central apertures for passing the light. These gears are in mesh with drive gear 34 driven by shaft 35 and knob 36. Kerr cell 5 rotates with polarizer 4.

In accordance with the invention, and in order to further reduce optical noise, there is provided in the general region of the approximately vertical image plane 40 of the approximately horizontal axis receiver objective 9 an aperture member 41 for limiting the access of light to and through said plane. This member is shown more fully in FIGURE 2. It includes a prismatic glass body 50 composed of two prisms 51, 52 with a mirrored interface surface 53 having a small unmirrored central area 54, said area intersecting the approximately horizontal axis of the receiver and the approximately vertical image plane 40, as best indicated in FIGURE 3. The shape of area 54 is elliptic, so as to present in effect a circular aperture area as the surface 53 is inclined to the direction of the light beam coming from receiver objective 9. The diameter of the circular area—the length of the minor axis of the ellipse—equals the diameter of the image of radiant spot in light source 2, so that substantially all light providing the signal can pass the aperture and reach the photocell, whereas substantially no disturbing background light can reach said cell.

The prismatic body 50 is rigidly mounted in a tube 55 which is adjustably mounted in housing 1 and which as shown extends from the source image, formed in aperture 54, at right angles to the plane of the two objectives 6, 9. A magnifying glass 56 is provided at the end of this tube for observing image plane 40 from outside cabinet 1 and for forming a telescope wherein lens 56 is the ocular and system 9 the objective. In this telescope, circle 54 appears as a small black dot, surrounded by a bright area of more or less uniform brightness. By observation of such black and bright areas it can be determined whether aperture 54 is properly adjusted to the position of the source image. It must be realized that the latter position varies with the position of the remote reflector returning the light signal. Aperture 54 can be brought into a position coinciding with the apex of the light cone formed by objective 9, as tube 55 is mounted on a slide member movable in directions 57. The tube is approximately horizontally movable at right angles to said directions, about pivot 58 and is approximately vertically movable at right angles to said directions, along an outer shell of member 41, by means of an adjustment mechanism shown directly above lens piece 56 and which is well known by itself. By suitable manipulation of the lens piece itself the tube is still further rotatable about its own axis.

It will readily be understood in the light of this disclosure that the light stop effect of member 53, applied to disturbing stray light, is appreciable. The total aperture of the receiver instrument must be sufficiently large to admit the light signal from a variety of positions of the remote reflector; and when said reflector is relatively close to cabinet 1, the source image may readily come to lie a few millimeters laterally of the axis of the objective. The follow-up mechanism 57, 58 allows application of an aperture of minimum size, thereby minimizing the optical noise created by the background light. The signal-noise ratio has been substantially improved by this expedient, thereby correspondingly extending the operating range of the instrument, particularly as to measured distances and as to hours of the day available for measuring work.

The invention can be used in a great variety of forms. The signal can for instance be formed of unpolarized light, or of invisible light, or of light modulated by different instruments. The signal can be used for measuring velocities instead of distances or for purposes other than measurements, for instance, for phototelegraphy. Transmitters and receivers can, accordingly, be separated from one another; and many additional changes are possible.

I claim:

1. In an electro-optical instrument for the demodulation of a modulated light signal originating from a source of light having an optical reproductive system and a photosensitive element and in which the modulated light flux is guided to the photosensitive element and is transformed into electrical power corresponding to the modulation of the light; said instrument including means to guide the modulated light flux after development of an intermediate image to the photosensitive element, a tube arranged in front of the photosensitive element with its axis at right angles to the axis of the intermediate image, a light stop mounted on one end of said tube level with the intermediate image to limit the cluster of optical image-reproducing rays with reference to stray light, means on the other end of the tube for the visual inspection of the intermediate image at the level with the light stop, and means for adjusting the tube and light stop in the direction of the axis of said image reproducing rays and into position coinciding with the apex of the light cone formed by the optical reproducing system.

2. In an electro-optical instrument for the demodulation of a modulated light signal originating from a source of light having an optical reproductive system and a photosensitive element and in which the modulated light flux is guided to the photosensitive element and is transformed into electrical power corresponding to the modulation of the light; said instrument including means to guide the modulated light flux after development of an intermediate image to the photosensitive element, a tube arranged in front of the photosensitive element with its axis at right angles to the axis of the intermediate image, a light stop assembly including an inclined mirrored interface surface having an unmirrored central elliptical area arranged between two prisms mounted on one end of said tube level with the intermediate image to limit the cluster of optical image reproducing rays with reference to stray light, means on the other end of the tube for the visual inspection of the intermediate image at the level with the light stop, and means for adjusting the tube and light stop in the direction of the axis of said image producing rays into a position wherein the unmirrored area coincides with the apex of the light cone formed by the optical reproducing system.

References Cited in the file of this patent

UNITED STATES PATENTS

| 1,573,401 | Heine | Feb. 16, 1926 |
| 1,840,448 | Heine | Jan. 12, 1932 |
| 2,184,015 | McFarlane | Dec. 19, 1939 |
| 2,800,831 | Keiser et al. | July 30, 1957 |

FOREIGN PATENTS

| 472,147 | Great Britain | Sept. 17, 1937 |
| 971,202 | France | Jan. 15, 1951 |

OTHER REFERENCES

Cranberg: "Sensory Aid for the Blind," Electronics, March 1946, pages 116–119.

"Geodimeter Determines Precise Baselines," Electronics, July 1955, pages 194, 196, 198.